United States Patent
Hofbauer

(10) Patent No.: US 8,307,805 B2
(45) Date of Patent: Nov. 13, 2012

(54) SCRAPER RING LUBRICATION SYSTEM FOR THE UPPER PORTION OF A PISTON AND ADJACENT CYLINDER LINER OF AN INTERNAL COMBUSTION ENGINE

(75) Inventor: Peter Hofbauer, West Bloomfield, MI (US)

(73) Assignee: EcoMotors International, Allen Park, MI (US)

( * ) Notice: Subject to any disclaimer, the term of this patent is extended or adjusted under 35 U.S.C. 154(b) by 285 days.

(21) Appl. No.: 12/823,412

(22) Filed: Jun. 25, 2010

(65) Prior Publication Data

US 2010/0326394 A1    Dec. 30, 2010

Related U.S. Application Data

(60) Provisional application No. 61/269,528, filed on Jun. 25, 2009.

(51) Int. Cl.
*F01M 3/04* (2006.01)
*F01B 25/08* (2006.01)
*F01B 75/28* (2006.01)

(52) U.S. Cl. .................. 123/196 M; 123/51 B
(58) Field of Classification Search .......... 123/51 B, 123/196 R, 196 M; 100/112; 83/136–141
See application file for complete search history.

(56) References Cited

U.S. PATENT DOCUMENTS

| | | | | |
|---|---|---|---|---|
| 1,504,448 A | * | 8/1924 | Hanch | 92/158 |
| 2,843,221 A | | 7/1958 | Haring | |
| 3,738,231 A | * | 6/1973 | Zurner | 92/159 |
| 4,516,481 A | * | 5/1985 | Geffroy et al. | 92/212 |
| 4,774,917 A | * | 10/1988 | Tokoro | 123/193.6 |
| 6,170,443 B1 | | 1/2001 | Hofbauer | |
| 6,347,575 B1 | * | 2/2002 | Booher | 92/208 |
| 7,509,937 B2 | * | 3/2009 | Hofbauer | 123/196 R |
| 7,735,834 B2 | | 6/2010 | Hofbauer | |
| 2010/0050978 A1 | | 3/2010 | Hofbauer | |

* cited by examiner

*Primary Examiner* — Nathaniel Wiehe
*Assistant Examiner* — Syed O Hasan
(74) *Attorney, Agent, or Firm* — Diana D. Brehob

(57) ABSTRACT

A lubrication system for an internal combustion engine is described that includes a scraper ring with an oil collector located immediately beneath an upper piston ring on a reciprocating piston. The scraper ring serves to deposit oil onto the inner surface of the upper cylinder liner near the combustion chamber in reaction to the decelerating movement of the piston as the piston approaches TDC. The oil scraper collects oil in a collection groove as the piston travels along the lower portion of the cylinder and carries inertia onto the cylinder liner.

17 Claims, 2 Drawing Sheets

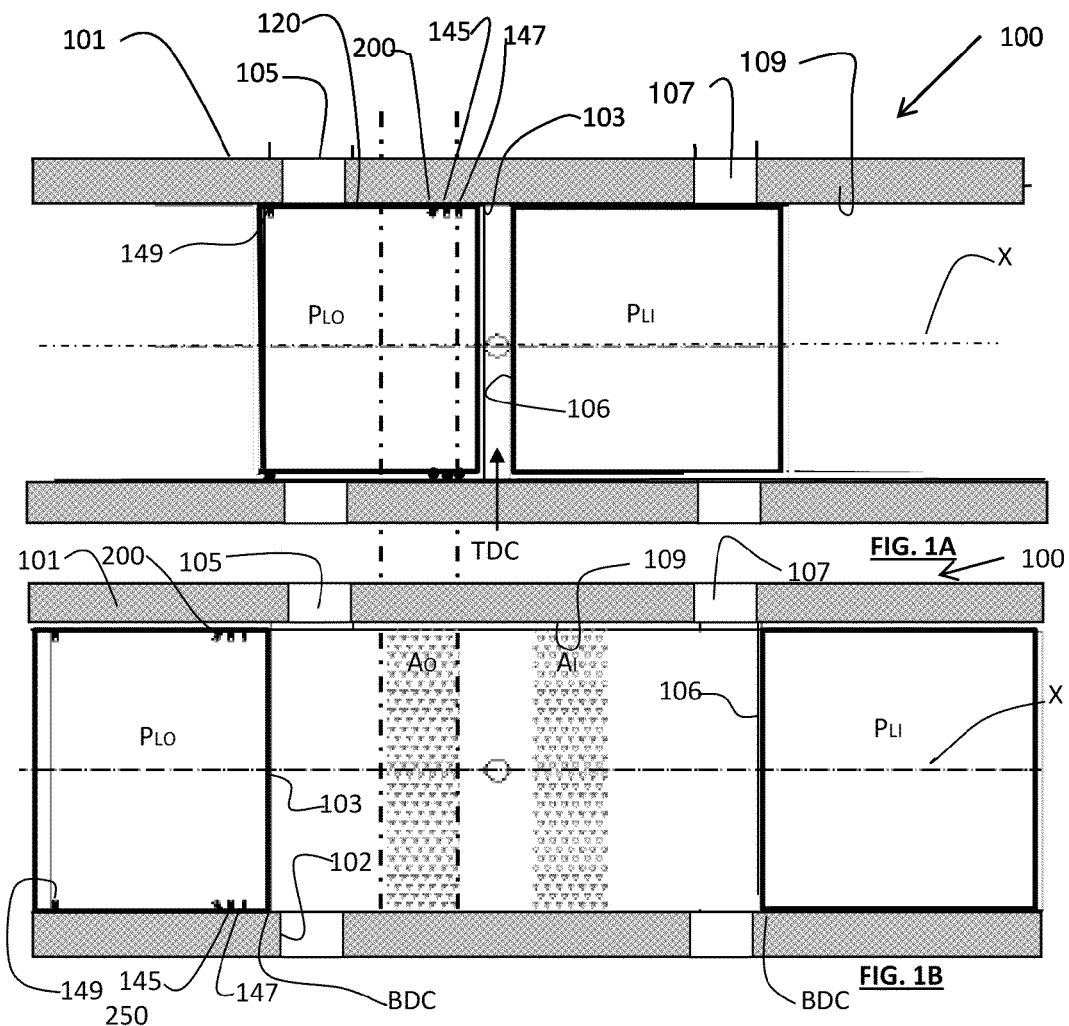
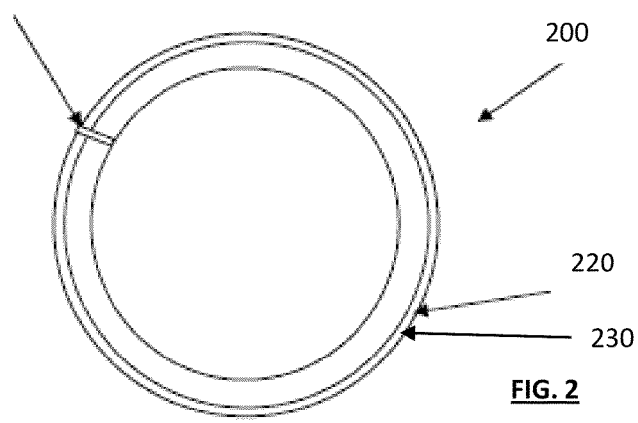

SCRAPER RING LUBRICATION SYSTEM FOR THE UPPER PORTION OF A PISTON AND ADJACENT CYLINDER LINER OF AN INTERNAL COMBUSTION ENGINE

RELATED APPLICATION

This application claims benefit of U.S. provisional application Ser. No. 61/269,528 filed Jun. 25, 2009 and is related to U.S. non-provisional application Ser. No. 12/583,916 filed Aug. 27, 2009 (Publ. US 2010/0050978).

FIELD

The invention is related to the field of internal combustion engines and more specifically to a lubrication system that supplies lubricating oil to the upper piston rings and cylinder liners of 2-cycle engines as the pistons approach their top dead center ("TDC") positions.

BACKGROUND

Many conventional internal combustion engines are configured to provide lubricating oil that sprays the cylinder walls or piston liners over which the piston rings travel during the stroke of the engine.

In some 2-cycle engines, such as the "Internal combustion engine with a single crankshaft and having opposed cylinders and opposed pistons" ("OPOC engine") described in my U.S. Pat. No. 6,170,443 and incorporated herein by reference, lubricating oil is pumped through passages in the crankshaft and connecting rods to the piston pins. Conventionally, crankcase oil is splashed into the cylinder area below the piston rings to effect wetting of the liner surfaces. In such lubrication systems, the piston rings pick up the lubricating oil as they pass over the wetted liner surfaces and carry it forward as the piston travels from bottom dead center ("BDC") towards top dead center ("TDC"). With each stroke, a small amount of oil is carried past the exhaust and inlet ports of the cylinder.

There is a need for improved lubrication systems as they apply to 2-cycle engines, since if the liner is too wet, the piston rings carry too much oil forward into the scavenging ports and into the combustion chamber. This results in loss of oil through exhaust ports that can result in HC emissions. Also, the moving of oil past intake ports causes some oil to be carried into the combustion chamber, which may alter the combustion process. Conversely, if not enough oil is transported to the piston rings, then excessive wear may result.

In my U.S. Pat. No. 7,735,834, which is incorporated herein by reference, a non-moving oil seal is disclosed that is mounted in the cylinder wall immediately below the exhaust/intake port to ensure both gas and oil tightness.

In my U.S. Pat. No. 7,509,937, which is incorporated herein by reference, a lubrication system includes an inertia pump within a piston that reacts to changes in inertia of the piston as it reaches TDC. The change in inertia causes the pump to react and force a predetermined measure of oil into the space between the piston and its adjacent cylinder wall immediately below the upper piston rings.

In my non-provisional application Ser. No. 12/583,916 referenced above, a small reservoir is contained in the piston that is filled when the piston is near its bottom dead center ("BDC") position and piston inertia is utilized to inject the proper amount of oil from the reservoir into the space between the piston cylinder liner and the lower piston ring of the upper set of piston rings near the piston crown as the piston is completing its compression stroke on its way to reaching TDC. This point of injection causes lubricating oil to effectively lubricate the top of the travel of the piston rings above the intake and exhaust ports and allows the injected lubricating oil to be drawn down the liner walls in a controlled manner.

SUMMARY

The embodiment illustrates the use of a piston scraper ring mounted immediately below the upper piston ring(s) that are/is located near the piston crown. In that position, the scraper ring collects residual oil present on the cylinder liner below the intake port and carries it towards the area of the liner adjacent the combustion chamber to provide adequate lubrication to the cylinder wall below the upper piston ring(s) during the power stroke after TDC. The scraper ring contains a circular reservoir for collecting oil during its movement with the piston from BDC towards TDC. As the piston speed changes (decelerates) when approaching its TDC position, the corresponding inertia change causes the lubricating oil within the reservoir of the scraper ring to be thrown or pushed towards the cylinder liner and deposited thereon below the upper piston rings. The deposited lubricating oil lubricates the cylinder liner at the top of travel of the piston rings near the defined combustion chamber, above the intake and exhausts ports; and allows the deposited lubricating oil to be drawn down the liner wall by the upper piston ring(s) in a controlled manner during the following power stroke.

Unlike the embodiments described in U.S. Pat. No. 7,509,937 referenced above, the presently disclosed embodiment does not incorporate any movable pump components in the piston. Rather, the presently disclosed embodiment relies on the use of strategically placed scraper ring spaced immediately below the upper piston rings on the piston to allow the mass of the oil collected by the scraper ring to be forced towards the cylinder liner and upper rings due to the deceleration of the piston when it approaches its TDC position. While the embodiments described herein show a pair of upper piston rings, above the scraper ring, in some designs, the scraper ring could be substituted for the lower one of the upper piston rings.

Unlike the embodiments described in the above-referenced non-provisional application Ser. No. 12/583,916, the installation of the presently disclosed scraper ring does not involve the longitudinal machining of the piston that is necessary to establish a reservoir.

It is an object of the present invention to provide an improved lubricating system for a 2-cycle engine by utilizing an oil delivery system that acts in response to deceleration of the piston as it approaches its TDC position to deposit a predetermined amount of oil onto the inner surface of the piston cylinder liner below the upper piston ring(s).

It is another object of the present invention to provide an improved lubricating system for a 2-cycle engine by utilizing an inertia reactive delivery system external to a piston to inject a predetermined amount of oil onto the piston cylinder liner near the TDC position of the piston.

It is a further object of the invention to provide an improved lubricating system for a 2-cycle engine that operates by piston inertia without any separately moving components.

BRIEF DESCRIPTION OF THE DRAWINGS

FIG. 1A is an elementary and partial cross-sectional drawing of the left cylinder of a 2-cycle OPOC engine showing the location of a scraper ring when the outer piston is near its TDC position.

FIG. 1B is a partial cross-sectional drawing of the left cylinder of a 2-cycle OPOC engine as in FIG. 1A, showing the location of a scraper ring embodiment when the outer piston is at its BDC position.

FIG. 2 is a plan view of a scraper ring embodiment shown in FIGS. 1A and 1B.

DETAILED DESCRIPTION

Figure 4:
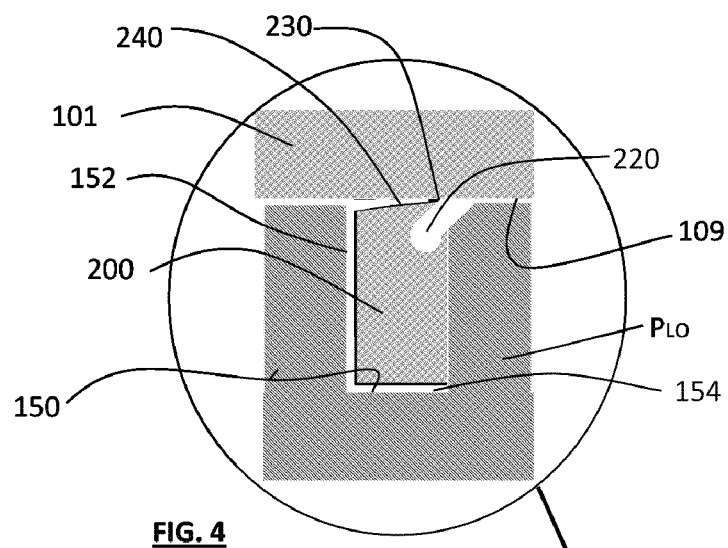
FIG. 4 is an enlarged partial cross-sectional view of the scraper ring corresponding to its location on the outer piston shown in FIG. 3.

While the scraper ring is applicable for several types of internal combustion engines, it is exemplified herein as being installed in a 2-cycle OPOC engine, such as that shown in the above-referenced applications and patents.

In FIGS. 1A and 1B, a single left cylinder 100 of a multi-cylinder OPOC engine is schematically represented with an outer piston ("$P_{LO}$") and an inner piston ("$P_{LI}$"). In FIG. 1A, the pistons are near their respective TDC positions in the cylinder 100. In FIG. 1B, the pistons are near their respective BDC positions in cylinder 100. (In an OPOC engine, the outer and inner pistons reach their respective TDC and BDC positions at slightly different times.) The pistons are mounted for reciprocating motion within the cylinder 100 along a cylinder axis "X" and are connected to a single crankshaft through push rods (inner cylinder) and pull rods (outer cylinder).

Cylinder 100 includes intake/exhaust ports 105 and 107 and a fuel injection port (not shown) normally located near the TDC position. In FIGS. 1A and 1B, a single set of ports 105 and 107 are schematically represented, but in a practical application (as shown in the above-referenced U.S. Pat. No. 7,509,937) the intake/exhaust ports are made to encircle the cylinder to provide an efficient means of moving gases into and out of the cylinder when the ports are exposed by the pistons at the end of each power stroke. Also, FIGS. 1A and 1B illustrate the embodiment of scraper ring 200 as being located in the left cylinder of an OPOC engine and more precisely in the outer piston $P_{LO}$ of the left cylinder. This representation is being made to facilitate the following explanation by eliminating duplicate descriptions of the right cylinder, and is not intended to limit the invention to any particular piston. It will be seen that the invention has practical use for many types of internal combustion engines and is so intended.

An inner piston $P_{LI}$ is shown at the right of cylinder 100 and has an upper face or piston crown 106. Outer piston $P_{LO}$ is shown at the left of cylinder 100 and has an upper face or piston crown 103. A cylinder liner 101 is represented and, of course, surrounds the pistons in a conventional manner. The detail shown in piston $P_{LO}$ includes a pair of upper piston rings 145 and 147 that are carried in annular grooves formed in the upper end of the piston just below upper face 103. A single lower piston ring 149 is at the extreme left of piston $P_{LO}$. In this embodiment, a scraper ring 200 is located just below the upper rings 145 and 147 and serves to deliver oil to the higher areas of the cylinder liner surface 109. Although not shown, the scraper ring could be substituted for the lower one of the upper pistons rings in some engine designs.

Piston $P_{LO}$ is represented in FIG. 1A at its TDC position. Piston $P_{LI}$ is represented as being near its TDC position. But due to delays between the inner and outer pistons inherent in OPOC engines, when $P_{LO}$ is at TDC piston $P_{LI}$ is either approaching TDC or leaving TDC, depending on the delay configuration.

For purposes of reference herein, the crown of each piston having a face that is exposed to combustion gases is defined as being at the top or upper portion of the piston; while other elements disposed on the cylindrical side skirt of the piston are defined as being located below the crown, even though the pistons are illustrated in the drawings as being movable from side to side.

As mentioned in the summary, the purpose of the invention is to provide a small measure of lubricating oil to the upper portion of the inner surface 109 of cylinder liner 101, near TDC. The areas of FIGS. 1A and 1B labeled AO and AI are the outer and inner cylinder areas that require such lubrication that is provided by the scraper ring 200. As can be seen from the piston configurations and locations in FIG. 1A, the area AO (identified by dashed lines extended upwards from FIG. 1B) is below upper piston rings 145 and 147 when piston PLO is at its TDC location. As the piston PLO approaches TDC, scraper ring 200 collects oil from inner surface 109 below area AO (to the left in the drawing), carries it past exhaust port 105, and allows the oil to be deposited onto the inner surface 109 at area AO. Due to the deceleration of outer piston PLO as it reaches its TDC position, the oil collected by scraper ring 200 has sufficient inertia to leave scraper ring 200 and deposit itself onto inner surface 109 of liner 101 in area AO.

In FIG. 1B, upper face 103 of piston $P_{LO}$ is shown as being at a point that leaves intake exhaust port 105 fully exposed to allow the exchange of gasses in the cylinder. Upper face 103 is below (to the left) or at least flush with the outer port surface 102 of exhaust port 105 when piston $P_{LO}$ is at BDC. When piston rings 149, 145 and 147 are in their BDC locations below port 105, the rings are lubricated by the lubricating oil that has been sprayed onto the liner below the exhaust port 105. However, upper rings 145 and 147 do not carry oil with them past port 105 and, without scraper ring 200, would encounter less oil on the liner surface in the area $A_O$.

FIG. 2 is a plan view of scraper ring 200 showing an outer scraper 230, an annular oil collection groove 220, and an open seam 250. Although shown as circular in FIG. 2, in its uninstalled and relaxed state, it would be slightly outwardly expansive at the seam so that when placed in the piston groove and cylinder liner, the outer edge will be biased against the liner surface 109. Open seam 250 serves to allow the scraper ring to be compressed inward when the piston is installed within the cylinder.

Figure 3:
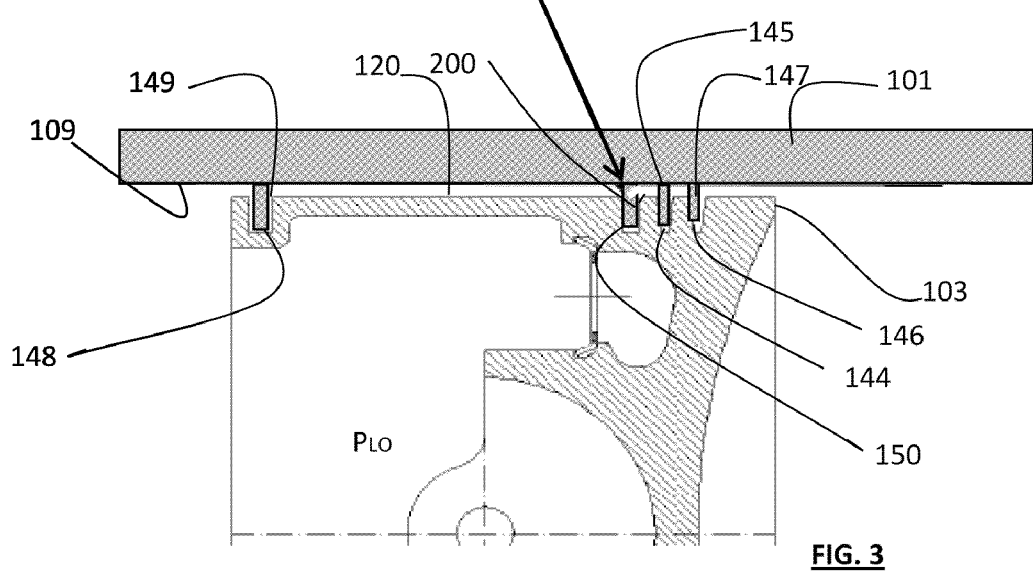
FIG. 3 is a partial cross-sectional drawing of the outer piston located in the left cylinder of a 2-cycle OPOC engine as in FIGS. 1A and 1B, showing the scraper ring mounted on the outer piston.

FIGS. 3 and 4 show more detail of the scraper ring 200 mounted in piston $P_{LO}$. Crown 103 is above upper piston rings 145 and 147 that are mounted in grooves 144 and 146, respectively. Crown 103 is exposed to the combustion gasses and forces. Upper piston rings 145 and 147 serve to prevent gases from migrating from the combustion chamber above the crown 103 into the space between the piston skirt 120 and the inner surface 109 of liner 101 and to provide a low friction sliding support for the piston within liner 101. Lower piston ring 149 is mounted in groove 148 and provides the alignment of the piston $P_{LO}$ in cylinder liner 101.

As can be seen in the enlargement of FIG. 4, scraper ring 200 is biased outwards so that the scraper edge 230 is against the inner surface 109 of cylinder liner 101. The collector groove 220 extends from the scraper edge 230 into the body of the ring and co-acts with the edge 230 to collect oil from the cylinder surface at the lower portions of the cylinder. Although scraper edge 230 is shown to be an extension of the outer surface 240 of ring 200, it should be noted that the outer edge 240 is preferably angled so that only the scraper edge 230 touches inner surface 109 of liner 101. Groove 150 is wider than the thickness of scraper ring 200 and provides a radial space 152 adjacent the lower side of ring 200. An annular space 154 is provided between the inner annular radius of ring 200 and the bottom of groove 150. Spaces 152 and 154 provide sufficient tolerance to allow scraper ring 200 to move within groove 150 and not cause binding.

In operation, when the piston reaches its BDC position, scraper ring 200 is contacting inner surface 109 of cylinder liner 101 at an area that receives relatively ample quantities of lubricating oil. As the piston moves from BDC towards the TDC position, it accelerates and therefore forces oil scraped from inner surface 109 by scraper edge 230 into collection groove 220. The collected oil remains in the collection groove over the distance of the piston compression stroke and carries it past the exhaust port 105 to the upper end of the cylinder. As the piston approaches TDC, it decelerates rapidly and the oil within the collector groove 220 leaves the groove through its own inertia to be deposited onto inner surface 109 in the area $A_O$. The amount of oil deposited by scraper ring 200 is sufficient to lubricate the travel of the upper rings as they recede from TDC towards BDC during each power stroke.

As mentioned earlier, the application of a scraper ring can be used in any reciprocating engine where it is desired to provide a low amount of lubricating oil to an upper portion of the cylinder below the upper piston ring(s). The embodiment has been described above with respect to the outer left piston on an OPOC engine, but it is equally applicable to any and all pistons in any internal combustion engine having reciprocating pistons.

I claim:

1. A system for lubricating the upper piston rings of an internal combustion engine and providing a predetermined measure of lubricating oil into each cylinder comprising:
   a piston containing a pair of upper piston rings near its crown;
   a scraper ring immediately below said upper piston rings for removing a predetermined amount of lubricating oil from a lower portion of the cylinder and conveying said oil to an upper portion of the cylinder;
   wherein said scraper ring contains a groove to contain said oil and said contained oil reacts to deceleration forces provided by the corresponding piston to leave said groove and deposit said predetermined amount of lubricating oil onto the inner surface of said cylinder as said piston reaches a top dead center position of its stroke.

2. The system as in claim 1, wherein said scraper ring contains an outer circular edge directly adjacent said inner surface of said cylinder and oriented towards said upper rings for scraping oil from said inner surface as said piston moves from a bottom dead center position towards said top dead center position.

3. The system as in claim 2, wherein said groove of said scraper ring is an annular groove having one side wall in contact with an edge of said scraper edge and oriented to precede said edge to capture and contain oil as said oil is removed from said inner surface of said cylinder as said piston moves from said bottom dead center position towards said top dead center position.

4. The system as in claim 3, wherein said annular groove is continuously open over the entire circumference of said scraper ring.

5. The system as in claim 4, wherein said scraper ring has an expansion gap formed to allow said scaper ring to be installed in said annular groove on said piston and expand to contact said inner surface of said cylinder.

6. A system for lubricating an internal combustion engine comprising:
   a piston containing at least one upper piston ring near the crown of said piston; and
   a scraper ring immediately below said at least one upper piston ring for removing a predetermined amount of lubricating oil from a lower portion of the cylinder and conveying said oil to an upper portion of the cylinder;
   wherein said scraper ring contains a groove to contain said oil and said contained oil reacts to deceleration forces provided by the corresponding piston to leave said groove and deposit said predetermined amount of lubricating oil onto the inner surface of said cylinder as said piston reaches a top dead center position of its stroke.

7. The system as in claim 6, wherein said scraper ring contains an outer circular edge directly adjacent said inner surface of said cylinder and oriented towards said at least one upper ring for scraping oil from said inner surface as said piston moves from a bottom dead center position towards said top dead center position.

8. The system as in claim 7, wherein said groove of said scraper ring is an annular groove having one side wall in contact with said circular scraper edge and oriented to precede said edge to capture and contain oil as said oil is removed from said inner surface of said cylinder as said piston moves from said bottom dead center position towards said top dead center position.

9. The system as in claim 8, wherein said annular groove is continuously open over the entire circumference of said scraper ring.

10. The system as in claim 9, wherein said scraper ring has an open seam formed to allow said scraper ring to be installed in an annular groove said piston and said scraper ring expands to contact said inner surface of said cylinder.

11. A method of lubricating a defined upper portion of a cylinder of an internal combustion engine in the area where a reciprocating upper piston ring of an associated piston approaches a top dead center portion of said cylinder, with lubricating oil collected from a defined lower portion of said cylinder in an area where the reciprocating piston ring approaches a bottom dead center portion of said cylinder, comprising the steps of:
   providing a reciprocating piston with a crown area exposed to combustion gases and a plurality of annular grooves on the side of said piston below said crown;
   providing at least one upper piston ring in one of said annular grooves closest to said crown of said piston;
   providing a scraper ring in another of said annular grooves immediately adjacent at least one upper piston ring, wherein said scraper ring is provided with an annular oil collection groove;
   during operation of said engine, utilizing said scraper ring for removing a predetermined amount of lubricating oil from said lower portion of said cylinder and conveying said oil to said upper portion of said cylinder; and
   expelling oil from said scraper ring collection groove onto the inner surface of the upper portion of said cylinder as said piston reaches a top dead center position of its stroke in reaction to deceleration forces provided thereon.

12. A system for lubricating an internal combustion engine comprising:
   a reciprocating piston containing at least one upper piston ring near a crown of said piston; and
   means mounted on said piston immediately below said at least one upper piston ring for removing a predetermined amount of lubricating oil from a defined lower portion of the cylinder and conveying said oil to a defined upper portion of the cylinder;

wherein said conveying means includes means for collecting said removed oil and expelling oil onto the inner surface of said cylinder as said piston reaches a top dead center position of its stroke in reaction to deceleration forces provided by the corresponding piston.

13. The system as in claim 12, wherein said conveying means is a scraper ring containing an outer circular edge directly adjacent said inner surface of said cylinder and oriented towards said at least one upper ring for scraping oil from said inner surface as said piston moves from a bottom dead center position towards said top dead center position.

14. The system as in claim 13, wherein means for collecting and expelling oil is an annular collection groove having one side wall in contact with said outer circular scraper edge and oriented to co-act with said edge to capture and contain oil as said oil is removed from said inner surface of said cylinder as said piston moves from its bottom dead center position towards said top dead center position.

15. The system as in claim 14, wherein said annular collection groove is continuously open over the entire circumference of said scraper ring.

16. The system as in claim 15, wherein said scraper ring has an expansion gap formed to allow said ring to be installed in an annular groove on said piston.

17. The system as in claim 15, wherein said scraper ring has an open seam formed to allow said ring to be installed in an annular groove on said piston.

\* \* \* \* \*